(12) United States Patent
Spindel et al.

(10) Patent No.: US 11,410,139 B1
(45) Date of Patent: Aug. 9, 2022

(54) APPORTIONING A PAYMENT CARD TRANSACTION AMONG MULTIPLE PAYERS

(71) Applicant: Block, Inc., San Francisco, CA (US)

(72) Inventors: Nathan Spindel, San Francisco, CA (US); Nefaur Rahman Khandker, San Francisco, CA (US); Shawn Morel, San Francisco, CA (US)

(73) Assignee: Block, Inc., San Francisco, CA (US)

( * ) Notice: Subject to any disclaimer, the term of this patent is extended or adjusted under 35 U.S.C. 154(b) by 0 days.

(21) Appl. No.: 16/846,358

(22) Filed: Apr. 12, 2020

Related U.S. Application Data

(63) Continuation of application No. 14/149,754, filed on Jan. 7, 2014, now Pat. No. 10,621,563.

(60) Provisional application No. 61/921,373, filed on Dec. 27, 2013.

(51) Int. Cl.
*G06Q 20/00* (2012.01)
*G06Q 30/00* (2012.01)
*G06Q 40/00* (2012.01)
*G06Q 50/00* (2012.01)
*G06Q 20/10* (2012.01)

(52) U.S. Cl.
CPC ............. *G06Q 20/10* (2013.01); *G06Q 30/00* (2013.01); *G06Q 40/00* (2013.01); *G06Q 50/00* (2013.01)

(58) Field of Classification Search
CPC ........ G06Q 20/10; G06Q 30/00; G06Q 40/00; G06Q 50/00
USPC ........................................................ 705/44
See application file for complete search history.

(56) References Cited

U.S. PATENT DOCUMENTS

| | | | |
|---|---|---|---|
| 6,175,922 B1 | 1/2001 | Wang | |
| 6,422,462 B1 | 7/2002 | Cohen | |
| 7,805,378 B2 | 9/2010 | Berardi et al. | |
| 8,190,514 B2 | 5/2012 | Bishop et al. | |
| 8,459,544 B2 | 6/2013 | Casey et al. | |
| 8,498,900 B1* | 7/2013 | Spirin ............ | G06Q 20/14 705/30 |
| 8,577,803 B2 | 11/2013 | Chatterjee et al. | |
| 8,602,296 B1 | 12/2013 | Velline et al. | |
| 8,700,526 B1* | 4/2014 | Cozens ............ | G06Q 50/01 705/40 |
| 8,712,854 B1 | 4/2014 | Rafferty et al. | |

(Continued)

OTHER PUBLICATIONS

Advisory Action dated Mar. 29, 2019, for U.S. Appl. No. 14/149,754, of Spindel, N., et al., filed Jan. 7, 2014.

(Continued)

*Primary Examiner* — Clifford B Madamba
(74) *Attorney, Agent, or Firm* — Lee & Hayes, P.C.

(57) ABSTRACT

The disclosed technique enables a consumer who uses a payment object to pay for goods or services to specify, by using a mobile device, how the transaction amount should be apportioned among multiple payers. In certain embodiments, the technique involves communication between a mobile payment application installed on the consumer's mobile device and a remote payment service system (PSS). The mobile payment application enables the user to specify how many payers there are, who the payers are, and exactly how the transaction amount should be apportioned among the payers. The mobile payment application communicates this information to the PSS, which then executes or triggers reimbursement to carry out the specified apportionment.

20 Claims, 10 Drawing Sheets

(56) References Cited

U.S. PATENT DOCUMENTS

| | | | |
|---|---|---|---|
| 8,732,085 B2 | 5/2014 | Bennett | |
| 8,972,298 B2 | 3/2015 | Kunz et al. | |
| 9,092,767 B1 | 7/2015 | Andrews et al. | |
| 9,092,776 B2 | 7/2015 | Dessert | |
| 9,092,828 B2 | 7/2015 | Hosp | |
| 9,836,739 B1 | 12/2017 | Borovsky et al. | |
| 9,881,305 B1 | 1/2018 | Lewis et al. | |
| 2004/0138999 A1 | 7/2004 | Friedman et al. | |
| 2005/0246245 A1 | 11/2005 | Satchell et al. | |
| 2006/0131385 A1 | 6/2006 | Kim | |
| 2006/0146839 A1 | 7/2006 | Hurwitz et al. | |
| 2007/0150387 A1 | 6/2007 | Seubert et al. | |
| 2007/0255653 A1* | 11/2007 | Tumminaro | G06Q 20/327 705/39 |
| 2007/0255662 A1 | 11/2007 | Tumminaro | |
| 2008/0052176 A1 | 2/2008 | Buchheit | |
| 2008/0078831 A1 | 4/2008 | Johnson et al. | |
| 2008/0270246 A1 | 10/2008 | Chen | |
| 2009/0094126 A1 | 4/2009 | Killian et al. | |
| 2009/0099961 A1 | 4/2009 | Ogilvy | |
| 2009/0119190 A1 | 5/2009 | Realini | |
| 2009/0266884 A1 | 10/2009 | Killian et al. | |
| 2009/0288012 A1 | 11/2009 | Hertel et al. | |
| 2009/0319638 A1 | 12/2009 | Faith et al. | |
| 2010/0010906 A1 | 1/2010 | Grecia | |
| 2010/0217674 A1 | 8/2010 | Kean | |
| 2010/0217699 A1 | 8/2010 | Bookstaff | |
| 2010/0306099 A1 | 12/2010 | Hirson et al. | |
| 2011/0029416 A1 | 2/2011 | Greenspan | |
| 2011/0035319 A1 | 2/2011 | Brand et al. | |
| 2011/0071892 A1 | 3/2011 | Dickelman | |
| 2011/0125633 A1 | 5/2011 | Aaltonen et al. | |
| 2011/0145049 A1 | 6/2011 | Hertel et al. | |
| 2011/0153438 A1 | 6/2011 | Dragt | |
| 2011/0178883 A1 | 7/2011 | Granbery et al. | |
| 2011/0180598 A1 | 7/2011 | Morgan et al. | |
| 2011/0218871 A1 | 9/2011 | Singh | |
| 2011/0246284 A1 | 10/2011 | Chaikin et al. | |
| 2011/0251962 A1 | 10/2011 | Hruska | |
| 2011/0276418 A1 | 11/2011 | Velani | |
| 2011/0313871 A1 | 12/2011 | Greenwood | |
| 2012/0011062 A1 | 1/2012 | Baker et al. | |
| 2012/0084210 A1 | 4/2012 | Farahmand | |
| 2012/0143772 A1 | 6/2012 | Abadir | |
| 2012/0150643 A1 | 6/2012 | Wolfe et al. | |
| 2012/0166311 A1 | 6/2012 | Dwight et al. | |
| 2012/0166331 A1 | 6/2012 | Varsavsky Waisman-Diamond | |
| 2012/0185355 A1 | 7/2012 | Kilroy | |
| 2012/0197740 A1 | 8/2012 | Grigg et al. | |
| 2012/0197743 A1 | 8/2012 | Grigg et al. | |
| 2012/0197794 A1 | 8/2012 | Grigg et al. | |
| 2012/0209749 A1 | 8/2012 | Hammad et al. | |
| 2012/0214416 A1 | 8/2012 | Kent et al. | |
| 2012/0253852 A1 | 10/2012 | Pourfallah et al. | |
| 2012/0254031 A1 | 10/2012 | Walker et al. | |
| 2012/0271707 A1 | 10/2012 | Harrison et al. | |
| 2012/0296726 A1 | 11/2012 | Dessert et al. | |
| 2013/0019284 A1 | 1/2013 | Pacyga et al. | |
| 2013/0041824 A1 | 2/2013 | Gupta | |
| 2013/0048719 A1 | 2/2013 | Bennett | |
| 2013/0054320 A1 | 2/2013 | Dorso et al. | |
| 2013/0138563 A1 | 5/2013 | Gilder et al. | |
| 2013/0144707 A1 | 6/2013 | Issacson et al. | |
| 2013/0159081 A1 | 6/2013 | Shastry et al. | |
| 2013/0159173 A1 | 6/2013 | Sivaraman et al. | |
| 2013/0166402 A1 | 6/2013 | Parento et al. | |
| 2013/0166445 A1 | 6/2013 | Issacson et al. | |
| 2013/0173407 A1 | 7/2013 | Killian et al. | |
| 2013/0181045 A1 | 7/2013 | Dessert et al. | |
| 2013/0204727 A1 | 8/2013 | Rothschild | |
| 2013/0218697 A1 | 8/2013 | Kingston et al. | |
| 2013/0218721 A1 | 8/2013 | Borhan et al. | |
| 2013/0246203 A1 | 9/2013 | Laracey | |
| 2013/0246258 A1 | 9/2013 | Dessert | |
| 2013/0317835 A1 | 11/2013 | Mathew | |
| 2013/0332354 A1 | 12/2013 | Rhee et al. | |
| 2013/0339253 A1 | 12/2013 | Sincai | |
| 2013/0346223 A1 | 12/2013 | Prabhu et al. | |
| 2014/0006205 A1 | 1/2014 | Berry et al. | |
| 2014/0012754 A1 | 1/2014 | Hanson et al. | |
| 2014/0032297 A1 | 1/2014 | Germann et al. | |
| 2014/0052617 A1 | 2/2014 | Chawla et al. | |
| 2014/0067557 A1 | 3/2014 | van Niekerk et al. | |
| 2014/0074569 A1 | 3/2014 | Francis et al. | |
| 2014/0074658 A1 | 3/2014 | Sanchez | |
| 2014/0074691 A1 | 3/2014 | Bank et al. | |
| 2014/0081783 A1 | 3/2014 | Paranjape et al. | |
| 2014/0081853 A1 | 3/2014 | Sanchez et al. | |
| 2014/0089073 A1 | 3/2014 | Jacobs et al. | |
| 2014/0089078 A1 | 3/2014 | Dessert et al. | |
| 2014/0100931 A1 | 4/2014 | Sanchez et al. | |
| 2014/0100973 A1 | 4/2014 | Brown et al. | |
| 2014/0101737 A1 | 4/2014 | Rhee | |
| 2014/0114775 A1 | 4/2014 | Cloin et al. | |
| 2014/0129942 A1 | 5/2014 | Rathod | |
| 2014/0136349 A1 | 5/2014 | Dave et al. | |
| 2014/0156508 A1 | 6/2014 | Argue et al. | |
| 2014/0156517 A1 | 6/2014 | Argue et al. | |
| 2014/0164234 A1 | 6/2014 | Coffman et al. | |
| 2014/0201067 A1 | 7/2014 | Lai et al. | |
| 2014/0214652 A1 | 7/2014 | Zheng et al. | |
| 2014/0249947 A1 | 9/2014 | Hicks et al. | |
| 2014/0250002 A1 | 9/2014 | Issacson et al. | |
| 2014/0279098 A1 | 9/2014 | Ham | |
| 2014/0372300 A1 | 12/2014 | Blythe | |
| 2015/0012426 A1 | 1/2015 | Purves et al. | |
| 2015/0032567 A1 | 1/2015 | Bhatia | |
| 2015/0066765 A1 | 3/2015 | Banks et al. | |
| 2015/0073907 A1 | 3/2015 | Purves et al. | |
| 2015/0095228 A1 | 4/2015 | Su et al. | |
| 2015/0100481 A1 | 4/2015 | Ghosh et al. | |
| 2015/0120418 A1 | 4/2015 | Cervenka et al. | |
| 2015/0134528 A1 | 5/2015 | Fineman et al. | |
| 2015/0178755 A1 | 5/2015 | Olson et al. | |
| 2015/0194023 A1 | 7/2015 | Brackenridge et al. | |
| 2016/0232527 A1 | 8/2016 | Patterson | |

OTHER PUBLICATIONS

Final Office Action dated Dec. 31, 2018, for U.S. Appl. No. 14/149,754, of Spindel, N., et al., filed Jan. 7, 2014.

Non-Final Office Action dated Jul. 11, 2019, for U.S. Appl. No. 14/149,754, of Spindel, N., et al., filed Jan. 7, 2014.

Non-Final Office Action dated Aug. 14, 2019, for U.S. Appl. No. 15/830,059, of Andrew Borovsky., et al., filed Dec. 4, 2017.

Advisory Action dated Apr. 25, 2019 for U.S. Appl. No. 14/526,337, of Wolter, J.A., filed Oct. 28, 2014.

Final Office Action dated May 2, 2019, for U.S. Appl. No. 15/900,433, of Rezayee, A., filed Feb. 20, 2018.

Notice of Allowance dated Dec. 12, 2019, for U.S. Appl. No. 14/149,754, of Spindel, N., et al., filed Jan. 7, 2014.

Notice of Allowance dated Oct. 18, 2019 for U.S. Appl. No. 14/208,800, of Thome, J.P., et al., filed Mar. 13, 2014.

Notice of Allowance dated Jan. 31, 2020, for U.S. Appl. No. 15/830,059, of Andrew Borovsky., et al., filed Dec. 4, 2017.

Non Final Office Action dated Feb. 21, 2020, for U.S. Appl. No. 16/160,626, of Andrew Borovsky, et al., filed Oct. 15, 2018.

Notice of Allowance dated Feb. 20, 2020 for U.S. Appl. No. 14/208,800, of Thome, J.P., et al., filed Mar. 13, 2014.

Non-Final Office Action dated Oct. 15, 2018, for U.S. Appl. No. 15/900,433, of Rezayee, A., filed Feb. 20, 2018.

Restriction Requirement dated Apr. 28, 2014, for U.S. Appl. No. 14/165,256, of Aaron, P., filed Jan. 27, 2014.

Non-Final Office Action dated Aug. 27, 2014, for U.S. Appl. No. 14/165,256, of Aaron, P., filed Jan. 27, 2014.

Non-Final Office Action dated Jan. 2, 2015, for U.S. Appl. No. 14/271,379, of Lewis, J., et al., filed May 6, 2014.

Final Office Action dated Mar. 17, 2015, for U.S. Appl. No. 14/165,256, of Aaron, P., filed Jan. 27, 2014.

Non-Final Office Action dated Apr. 27, 2015, for U.S. Appl. No. 14/184,503 of Borovsky, A., et al., filed Feb. 19, 2014.

(56) References Cited

OTHER PUBLICATIONS

Final Office Action dated Jun. 26, 2015, for U.S. Appl. No. 14/271,379, of Lewis, J., et al., filed May 6, 2014.
Non-Final Office Action dated Jul. 2, 2015, for U.S. Appl. No. 14/208,800, of Thome, J.P., et al., filed Mar. 13, 2014.
Final Office Action dated Sep. 21, 2015, for U.S. Appl. No. 14/184,503, of Borovsky, A., et al., filed Feb. 19, 2014.
Non-Final Office Action dated Sep. 30, 2015, for U.S. Appl. No. 14/189,880, of Aaron, P., et al., filed Feb. 25, 2014.
Non-Final Office Action dated Oct. 8, 2015, for U.S. Appl. No. 14/149,754, of Spindel, N., et al., filed Jan. 7, 2014.
Non-Final Office Action dated Oct. 8, 2015, for U.S. Appl. No. 14/165,256, of Aaron, P., filed Jan. 27, 2014.
Advisory Action dated Dec. 4, 2015, for U.S. Appl. No. 14/184,503, of Borovsky, A., et al., filed Feb. 19, 2014.
Final Office Action dated Dec. 31, 2015, for U.S. Appl. No. 14/208,800, of Thome, J.P., et al., filed Mar. 13, 2014.
Non-Final Office Action dated Mar. 31, 2016, for U.S. Appl. No. 14/271,379, of Lewis, J., et al., filed May 6, 2014.
Final Office Action dated Apr. 13, 2016, for U.S. Appl. No. 14/165,256, of Aaron, P., filed Jan. 27, 2014.
Final Office Action dated Apr. 28, 2016, for U.S. Appl. No. 14/189,880, of Aaron, P., et al., filed Feb. 25, 2014.
Non-Final Office Action dated Jun. 7, 2016, for U.S. Appl. No. 14/208,800, of Thome, J.P., et al., filed Mar. 13, 2014.
Non-Final Office Action dated Jun. 17, 2016, for U.S. Appl. No. 14/184,503, of Borovsky, A., et al., filed Feb. 19, 2014.
Final Office Action dated Jun. 17, 2016, for U.S. Appl. No. 14/149,754, of Spindel, N., et al., filed Jan. 7, 2014.
Requirement for Restriction dated Jul. 29, 2016, U.S. Appl. No. 14/168,274, of Odawa, A.W., et al., filed Jan. 30, 2014.
Advisory Action dated Sep. 21, 2016, for U.S. Appl. No. 14/149,754, of Spindel, N., et al., filed Jan. 7, 2014.
Non-Final Office Action dated Sep. 21, 2016, for U.S. Appl. No. 14/189,880, of Aaron, P., et al., filed Feb. 25, 2014.
Final Office Action dated Oct. 6, 2016, for U.S. Appl. No. 14/271,379, of Lewis, J., et al., filed May 6, 2014.
Final Office Action dated Nov. 30, 2016, for U.S. Appl. No. 14/208,800, of Thome, J.P., et al., filed Mar. 13, 2014.
Final Office Action dated Dec. 27, 2016, for U.S. Appl. No. 14/184,503, of Borovsky, A., et al., filed Feb. 19, 2014.
Advisory Action dated Dec. 29, 2016, for U.S. Appl. No. 14/271,379, of Lewis, J., et al., filed May 6, 2014.
Non-Final Office Action dated Jan. 20, 2017, for U.S. Appl. No. 14/168,274, of Odawa, A.W., et al., filed Jan. 30, 2014.
Final Office Action dated Mar. 2, 2017, for U.S. Appl. No. 14/189,880, of Aaron, P., et al., filed Feb. 25, 2014.
Advisory Action dated Mar. 9, 2017, for U.S. Appl. No. 14/184,503, of Borovsky, A., et al., filed Feb. 19, 2014.
Restriction Requirement dated Mar. 20, 2017, for U.S. Appl. No. 14/526,337, of Wolter, J.A., filed Oct. 28, 2014.
Restriction Requirement dated Mar. 31, 2017, for U.S. Appl. No. 14/271,379, of Lewis, J., et al., filed May 6, 2014.
Non-Final Office Action dated Apr. 21, 2017, for U.S. Appl. No. 14/149,754, of Spindel, N., et al., filed Jan. 7, 2014.
Final Office Action dated May 19, 2017, for U.S. Appl. No. 14/168,274, of Odawa, A.W., et al., filed Jan. 30, 2014.
Notice of Allowance dated Jul. 6, 2017, for U.S. Appl. No. 14/184,503, of Borovsky, A., et al., filed Feb. 19, 2014.
Non-Final Office Action dated Aug. 4, 2017, for U.S. Appl. No. 14/526,337, of Wolter, J.A., filed Oct. 28, 2014.
Notice of Allowance dated Sep. 18, 2017, for U.S. Appl. No. 14/271,379, of Lewis, J., et al., filed May 6, 2014.
Examiner's Answer to Appeal Brief dated Nov. 17, 2017, for U.S. Appl. No. 14/208,800, of Thome, J.P., et al., filed Mar. 13, 2014.
Examiner's Answer to Appeal Brief dated Nov. 29, 2017, for U.S. Appl. No. 14/168,274, of Odawa, A.W., et al., filed Jan. 30, 2014.
Final Office Action dated Dec. 1, 2017, for U.S. Appl. No. 14/149,754, of Spindel, N., et al., filed Jan. 7, 2014.
Non-Final Office Action dated Dec. 29, 2017, for U.S. Appl. No. 14/165,256, of Aaron, P., filed Jan. 27, 2014.
Examiner's Answer to Appeal Brief dated Jan. 18, 2018, for U.S. Appl. No. 14/189,880, of Aaron, P., et al., filed Feb. 25, 2014.
Final Office Action dated Mar. 14, 2018, for U.S. Appl. No. 14/526,337, of Wolter, J.A., filed Oct. 28, 2014.
Advisory Action dated Mar. 16, 2018, for U.S. Appl. No. 14/149,754, of Spindel, N., et al., filed Jan. 7, 2014.
Advisory Action dated Oct. 4, 2018, for U.S. Appl. No. 14/165,256, of Aaron, P., filed Jan. 27, 2014.
Non-Final Office Action dated May 17, 2018, for U.S. Appl. No. 14/149,754, of Spindel, N., et al., filed Jan. 7, 2014.
Restriction Requirement dated May 18, 2018, for U.S. Appl. No. 15/900,433, of Rezayee, A., et al., filed Feb. 20, 2018.
Non-Final Office Action dated Jul. 6, 2018, for U.S. Appl. No. 14/526,337, of Wolter, J.A., filed Oct. 28, 2014.
Final Office Action dated Jul. 27, 2018, for U.S. Appl. No. 14/165,256, of Aaron, P., filed Jan. 27, 2014.
Final Office Action dated Feb. 12, 2019 for U.S. Appl. No. 14/526,337, of Wolter, J.A., filed Oct. 28, 2014.

* cited by examiner

Transaction Confirmation for
Joe's Restaurant
6:38 PM December 26, 2013

Total Amount: $52.87

Specify number of payers, including yourself:

302

Transaction Confirmation for
Joe's Restaurant
6:38 PM December 26, 2013

Total Amount: $52.87

- ⦿ Divide total amount equally
- ○ Specify amount for each payer
- ○ Specify percentage of total amount for each payer
- ○ Assign specific items to payers

[ Back ]   [ Next ]

*FIG. 3F*

Transaction Confirmation for
Joe's Restaurant
6:38 PM December 26, 2013
Total Amount: $52.87

Enter email addresses of payers:

1 Linguine with claims          $18.00
Payer: [          ]

1 New York Steak                $25.00
Payer: [          ]

1 House red wine                 $8.00
Payer: [          ]

▽ More

[ Back ]    [ Request Cash ]

*FIG. 3G*

APPORTIONING A PAYMENT CARD TRANSACTION AMONG MULTIPLE PAYERS

This application claims the benefit of U.S. patent application Ser. No. 14/149,754, filed on Jan. 7, 2014, and issued as U.S. Pat. No. 10,621,563 on Apr. 14, 2020, which claims the benefit of U.S. Provisional Patent Application No. 61/921,373, filed on Dec. 27, 2013. These applications are hereby incorporated by reference as if fully set forth herein.

FIELD OF THE INVENTION

At least one embodiment of the present invention pertains to financial transactions involving payment cards, and more particularly, to a technique for apportioning a payment card transaction among multiple payers.

BACKGROUND

When two or more people want to share the cost of a purchase, apportioning the cost between them can be problematic, especially when one or more of them wants to pay by credit card. Consider, for example, the situation in which a social group gathers for a meal at a restaurant, where everyone is to pay for his or her own food and drink. When it comes time to pay the check, the need to determine how much each person owes and settle the bill creates an inconvenient and sometimes awkward interruption in the social interaction of the group. Making this process go smoothly can be a challenge, even more so if the group includes a mixture of single people and couples or families.

There are various ways of handling this kind of situation. For example, in one common approach, one member of the group uses a credit card, and the other members of the group reimburse that person with cash for their portions. With this approach, it is inconvenient and often time-consuming to have to calculate how much each person (or each couple or family) owes and then collect cash from the other members of the group. Additionally, it is common that some members of the group end up paying more or less than their fair share (with the person who paid by credit card often paying more than his fair share). In another common approach, the group asks the waiter to split the check in a certain manner, and everyone then either pays cash or uses his own credit card. This approach can also be troublesome if the check is not being split equally, and regardless, it is inconvenient and time-consuming for the waiter. In any of these situations, the need to deal with these issues detracts from the social atmosphere of the event.

BRIEF DESCRIPTION OF THE DRAWINGS

One or more embodiments of the present invention are illustrated by way of example and not limitation in the figures of the accompanying drawings, in which like references indicate similar elements.

FIGS. 3A through 3G show examples of various screen displays that can be generated by a consumer's processing device to enable bill splitting.

DETAILED DESCRIPTION

Figure 1:
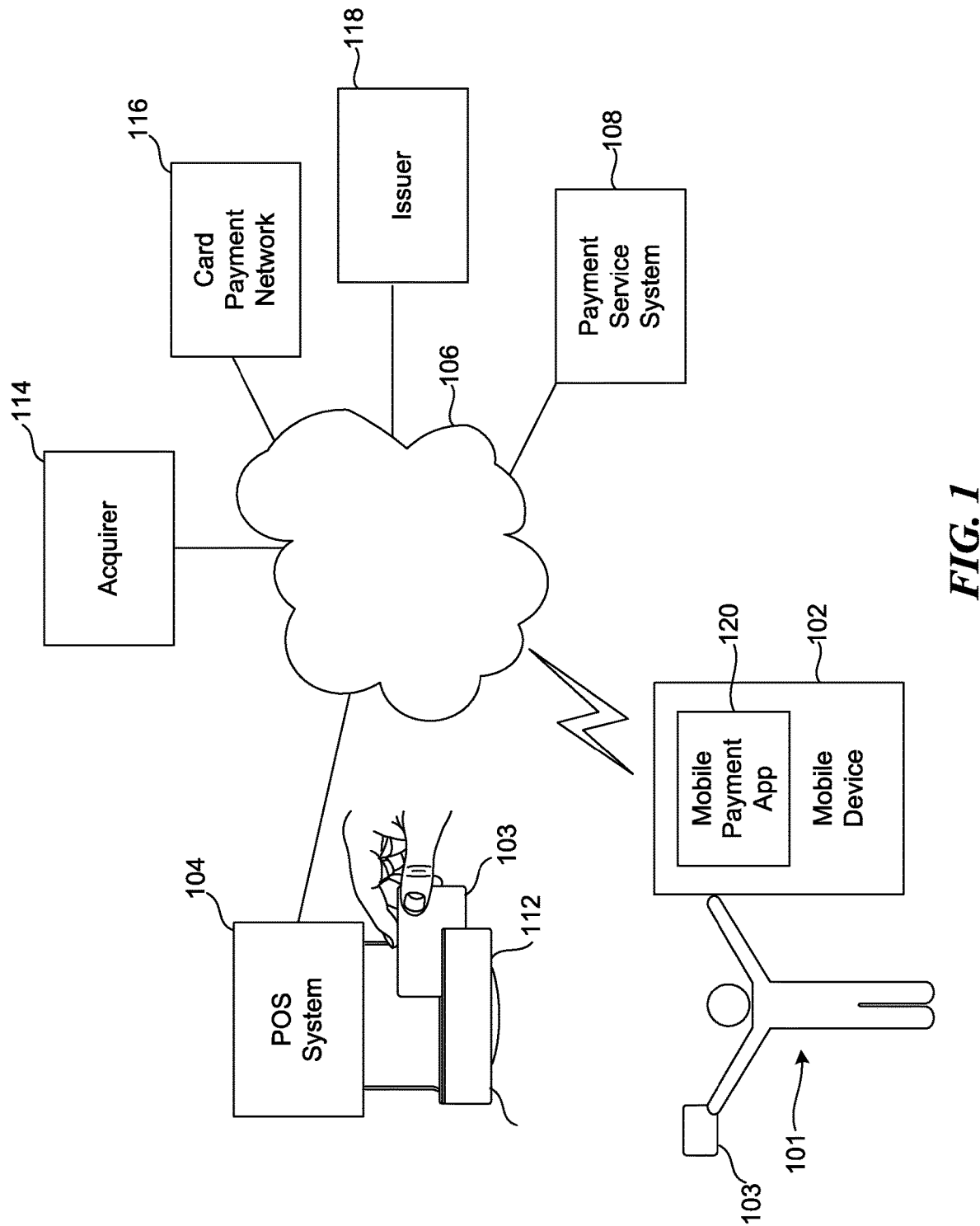
FIG. 1 illustrates an environment in which the bill splitting technique introduced here can be implemented.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Introduced here is a technique for apportioning the cost of a purchase or other financial transaction among multiple payers, particularly (though not exclusively) where one of the payers uses a payment card to pay for the transaction. The term "payment card" as used herein means a credit card, debit card, prepaid gift card, or the like, or a card which functions as a combination of any of these mechanism. A payment card is a specific type of payment object. Other types of payment objects are discussed below.

Briefly described, the technique introduced here enables a consumer who uses a payment card to pay for goods or services to specify, by using his mobile device (e.g., a smartphone or tablet computer), how the transaction amount should be apportioned among multiple payers. Such apportionment is called "bill splitting" in this description, as shorthand. In certain embodiments, the technique involves communication between a mobile payment application installed on the consumer's mobile device and a remote payment service system (PSS). The mobile payment application enables the user to specify (either at the time of the transaction or at a later time) how many payers there are, who the payers are, and exactly how the transaction amount should be apportioned (how the bill should be split) among the payers. The mobile payment application communicates this information to the PSS, which then executes or triggers execution of the transfer of funds to carry out the specified apportionment.

The technique introduced here makes bill splitting relatively quick and easy compared to traditional methods. Furthermore, since the apportionment can be specified by the consumer and effectuated well after the transaction has completed, the technique greatly reduces the potential for awkward interruptions to the social flow of group events due to bill splitting issues.

As described further below, to initiate a payment transaction according to one embodiment of the technique, a consumer first presents a payment card to a merchant. The merchant swipes the payment card of the consumer with a card reader at the merchant's point-of-sale (POS) system, in the traditional manner. The term "swipe" here refers to any manner of triggering a physical card reader to read a physical card, such as passing a card through a magnetic stripe card reader, optical scanner, or smartcard reader, radio frequency identification (RFID) reader, or the like. The term "sale", such as in "point-of-sale," refers to any type of payment-oriented transaction, including a lease or rental for example, and is not limited to an actual purchase.

In response to the card swipe, the merchant's POS system transmits onto a network a standard transaction approval request, which gets routed to the PSS. The transaction approval request includes data commonly associated with traditional payment card transaction approval requests. However, in certain embodiments the consumer's payment card bears a card number such that the transaction approval request gets routed to the PSS. When the PSS receives the transaction approval request, the PSS may determine whether the transaction can be approved, or it may signal another entity to make that determination. The PSS then communicates the result of the request (e.g., approved or denied) to the merchant's POS system.

Also in response to the transaction approval request, the PSS identifies a mobile device associated with the consumer and sends a message indicating the result of the request to the consumer's mobile device. The PSS can identify the mobile device of the consumer by performing a database lookup, based on an association between the consumer's payment card and the mobile device, which the consumer previously specified to the PSS. The PSS then sends to the consumer's mobile device a message directed to a mobile payment application installed on the consumer's mobile device. The message is configured to cause the mobile payment application to output to the consumer a user interface that prompts the consumer to (optionally) specify apportionment information indicating the manner of apportioning the transaction amount among two or more payers (e.g., people). The payers may all be human beings, however, it is possible that one or more of the payers may be a non-human entity, such as a corporation or other organization.

In some embodiments, the mobile payment application, in response to the message from the PSS, allows the consumer to specify the number of payers for the transaction and the manner in which the transaction amount should be apportioned and the names of the payers. In some embodiments, the mobile payment application can also suggest potential payers to the consumer. The suggestion may be based on, for example, an address book of the consumer stored in the mobile device, a list of recent contacts of the consumer stored on the mobile device, information on other nearby users of the mobile payment application, or a combination thereof.

After the consumer has input the apportionment information to the mobile device, the mobile payment application causes the mobile device to transmit a message to convey that apportionment information to the PSS. The PSS then executes or triggers a reimbursement process to carry out the desired apportionment, according to the apportionment information received from the mobile device.

In certain embodiments, the consumer's payment card has a pre-established association with the PSS, such that any transaction approval request relating to that card will get routed to the PSS. In such embodiments, the consumer's payment card may be a "proxy card." A proxy card is a card that bears a card number/account number that appears to be that of a real credit or debit card account (i.e., it is in the correct format), but where that card/account number is actually only a proxy for the consumer's real card/account number. In that case, the consumer's real account number is stored by the PSS in association with the proxy card account number, and is used to pay for a transaction made using the card. Further, such a proxy card may be associated with multiple accounts and/or other payment mechanisms of different types (e.g., credit card accounts, debit card accounts, etc.) of the consumer, where any one of those payment mechanisms can be selected by the consumer or automatically by the PSS to pay for a given transaction.

Additionally, while the consumer generally uses a mobile device to specify the apportionment of the transaction in the embodiments emphasized herein, in other embodiments the consumer may use a processing device other than a mobile device to specify that information, such as a conventional personal computer (PC). In such embodiments, the mobile payment application can be replaced by a more conventional software application in such processing device, where such software application has functionality similar to that of the mobile payment application as described herein.

In certain embodiments, a consumer can use a payment object other than a payment card to initiate a transaction with bill splitting as described above. An example of another type of payment object is a biometrically identifiable object, such as a person's finger (e.g., for fingerprint recognition), face, iris or retina. Alternatively, a payment object can be a software object or virtual object, such as a virtual wallet.

FIG. 1 illustrates an environment in which the bill splitting technique introduced here can be implemented. The environment includes a mobile device 102 belonging to a user 101 (also referred to as "customer" or "consumer"), and a merchant POS system 104. The mobile device 102 can be, for example, a smart phone, tablet computer, notebook computer, or any other form of mobile processing device. A mobile payment application 120 runs on the user's mobile device 102. The environment also includes a computer system 114 of the merchant's acquirer, a computer system 118 of an issuing bank, a computer system 116 of a card payment network, and a computer system 108 of a payment service (hereinafter "payment service system (PSS) 108"). Each of the aforementioned computer systems can include one or more distinct physical computers and/or other processing devices which, in the case of multiple devices, can be connected to each other through one or more wired and/or wireless networks. All of the aforementioned devices are coupled to each other through an internetwork 106, which can be or include the Internet and one or more wireless networks (e.g., a WiFi network and/or a cellular telecommunications network).

In a traditional credit card transaction, the merchant would swipe the user's credit card through a card reader 112 at the POS system 104. The POS system 104 would then send data read from the card (e.g., the cardholders name, credit card number, expiration date and card verification value (CVV)) to the computer system 114 of the merchant's acquirer (hereinafter "acquirer 114"). The acquirer 114 would then send this data to the computer system 116 of the card payment network (e.g., Visa or MasterCard) (hereinafter "card payment network 116"), which would forward the data to the computer system 118 of the issuing bank (hereinafter "issuer 118"). If the transaction is approved by the issuer 118, a payment authorization message would be sent from the issuer 118 to the merchant POS system 104 via a path generally opposite of that described above.

Figure 2:
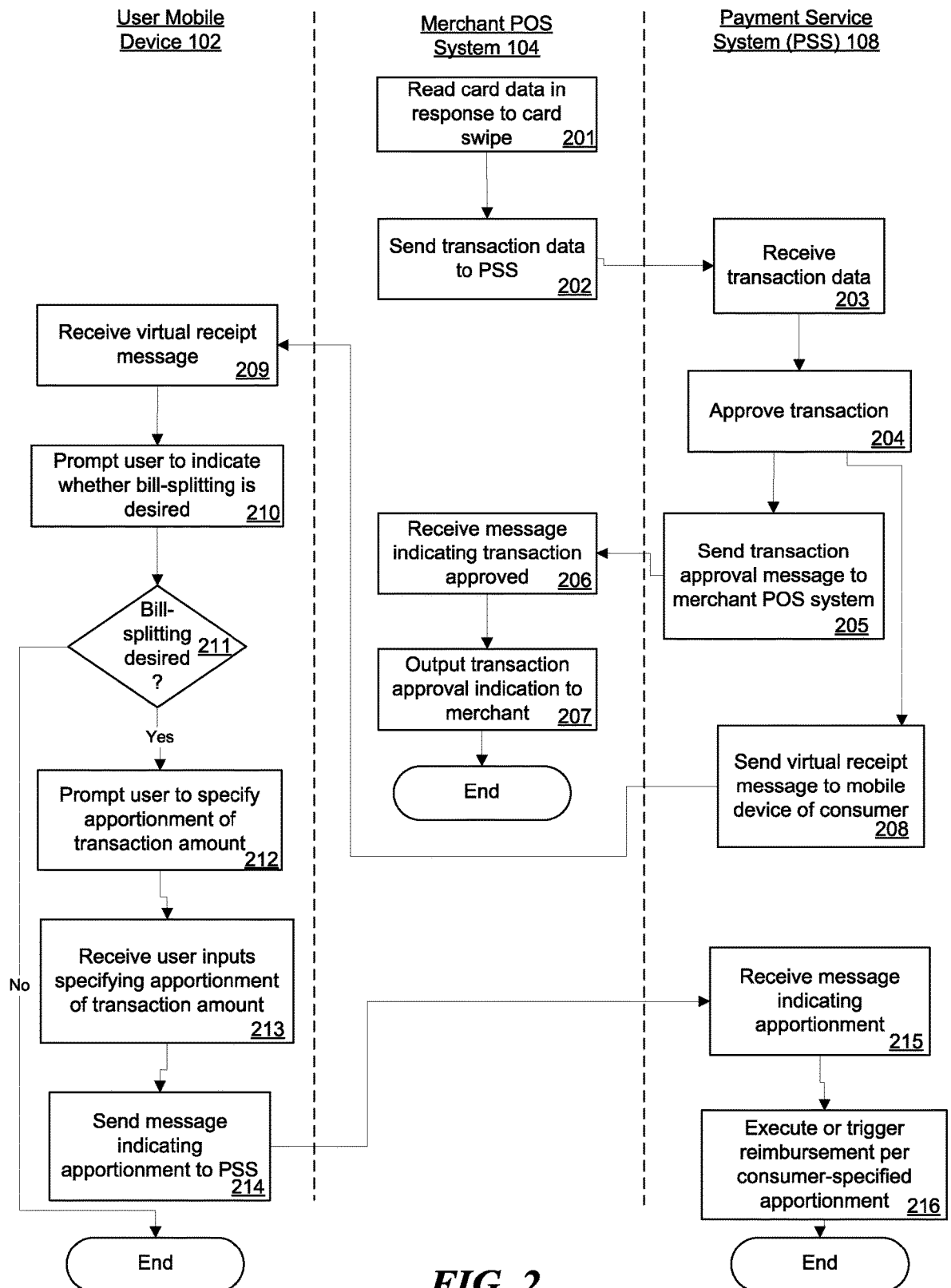
FIG. 2 is a flow diagram illustrating an example of a process for bill splitting in connection with use of a payment card.

FIG. 2 illustrates an example of a process for bill splitting in accordance with the technique introduced here. For purposes of illustration only, the process of FIG. 2 is explained with reference to certain elements illustrated in FIG. 1. The process begins at step 201, in which the merchant POS system 104 initiates a payment transaction by reading card data from the consumer's payment card 103 in response to a card swipe through the card reader 112. The payment card 103 can be an actual credit or debit card of the consumer, for example, or it can instead be a proxy card such as described above, e.g., a card issued by the PSS 108 and associated with one or more financial accounts of the consumer. The card data can include, for example, the consumer's name, card number, card expiration date, and card verification value (CVV). At step 202, in response to the card swipe the merchant POS system 104 transmits onto the internetwork 106 a transaction approval request that includes data about the transaction ("transaction data"), for transmission to the PSS 108. The transaction data can include, for example, the aforementioned card data as well as the amount of the transaction, current date and time, data identifying the merchant and the merchant's merchant category code (MCC).

The transaction approval request may be transmitted directly to the PSS 108, or it may get routed to the PSS 108 through one or more intermediary entities, such as the acquirer 114 and/or card payment network 116, etc. In certain embodiments, the card number on the consumer's payment card is sufficient to enable routing entities to determine that the transaction approval request should be routed to the PSS 108, such as in the case where the payment card is a proxy card issued by the PSS 108. Upon receiving the transaction approval request (step 203), the PSS 108 approves the transaction at step 204 (for the sake of simplicity, the scenario in which the transaction is denied is not discussed here, since it is not germane to the technique being introduced here).

In response to the transaction being approved, the PSS 108 performs at least the following two additional operations. At step 205, the PSS 108 sends onto internetwork 106 a transaction approval message, for transmission to the merchant POS system 104. In addition, at step 208 the PSS 108 transmits a virtual receipt message onto internetwork 106, for transmission to the mobile device 102 of the consumer over a wireless communications network. The virtual receipt message contains information regarding the transaction, i.e., a virtual receipt, including whether the transaction has been approved, the amount of the transaction, the name of the merchant, and in at least some instances, an itemization of the items purchased in (or otherwise the subject of) the transaction. Note that steps 205 and 208 can be performed in any order or concurrently. At step 206, the merchant POS system 104 receives the transaction approval message sent by the PSS 108 and, in response, it outputs a conventional transaction approval indication to the merchant at step 207. The indication may be in the form of, for example, a printed receipt, a message displayed on a display device, or both.

Figure 3A:
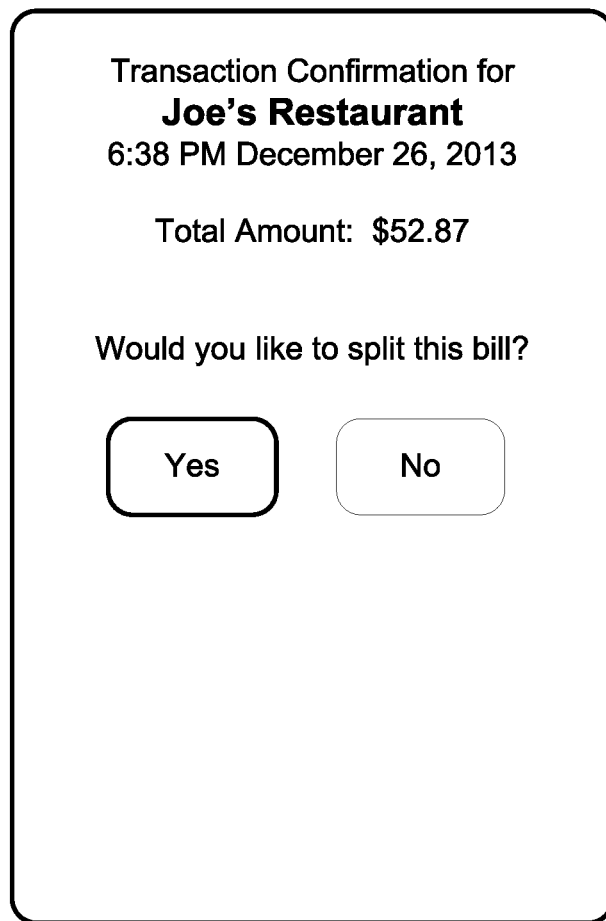

Additionally, at step 209 the user's mobile device 102 receives the virtual receipt message sent by the PSS 108. Within the user's mobile device 102, the virtual receipt message is conveyed up through the various lower protocol layers to the mobile payment application (hereinafter simply "mobile application") 120, which recognizes the virtual receipt message as such. In response to recognizing this message, at step 210 the mobile application 120 causes the mobile device 102 to display the virtual receipt to the consumer and to prompt the consumer to indicate whether bill splitting is desired. An example of what such a display may look like is illustrated in FIG. 3A. The consumer can indicate that he would like to split the bill by, for example, touching the highlighted "Yes" button on a touchscreen display of the mobile device 102. If the consumer indicates that bill splitting is not desired, the process ends.

Note that while bill splitting capability is desirable in certain settings, such as in restaurants, it may not be appropriate with every type of transaction or merchant. For example, it is uncommon (though not inconceivable) to split among multiple people the cost of airline tickets or a purchase at a department store. Therefore, in some embodiments the consumer is only prompted to split the bill if the transaction relates to a certain type of merchant, such as a restaurant or other type of establishment in which bill splitting is common. The type of merchant may be determined, for example, from the merchant category code (MCC) commonly included in a transaction approval request sent from a merchant's POS system. The determination of the type of merchant may be made by the PSS 108, in which case the virtual receipt message sent from the POS 108 to the user's mobile device 102 (step 208) can include a flag or other similar indication, to indicate to the mobile application 120 whether to output the bill splitting prompt to the consumer.

Referring still to FIG. 2, the mobile application 120 receives the consumer's input in response to the prompt at step 211. Notably, the user can provide this input at any time convenient for the consumer, which may be while the consumer is still present at the merchant or at a later time. This flexibility helps to avoid disrupting the social flow in, for example, a group meal at a restaurant. Assuming the consumer indicates that bill splitting is desired, a mobile application 120 then prompts the consumer at step 212 to specify how and between whom the transaction amount should be apportioned. After the mobile application 120 has received all of the detailed apportionment information from the consumer, specifying the apportionment of the transaction amount (step 213), the mobile application 120 at step 214 causes the mobile device 102 to send a message indicating that desired apportionment to the PSS 108, via the wireless network.

Figure 3B:
Figure 3C:
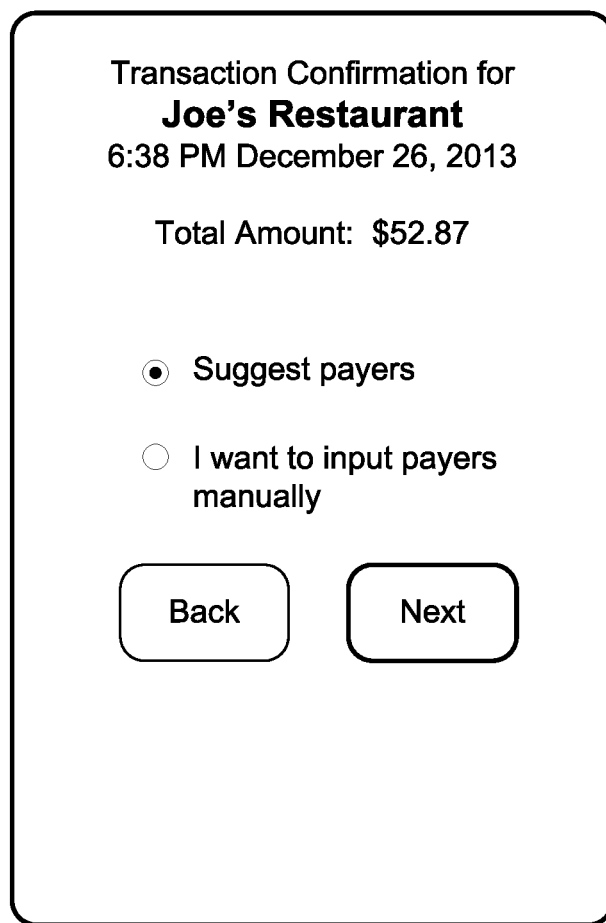

FIGS. 3B through 3G show additional examples of screen displays that may be generated by the mobile device 102 to solicit and receive the apportionment information from the consumer. For example, initially the mobile device 102 may output a display such as illustrated in FIG. 3B, in which the consumer is asked to input the number of payers into an input field 302. As noted above, the mobile application 120 can suggest payers to the consumer. The consumer may choose the appropriate option either to have the mobile application 120 suggest payers or to identify the payers manually, as indicated in FIG. 3C. Alternatively, the user could input his choice of receiving the suggestion or manual input as a configuration setting of the mobile application 120, prior to operation.

Figure 3D:
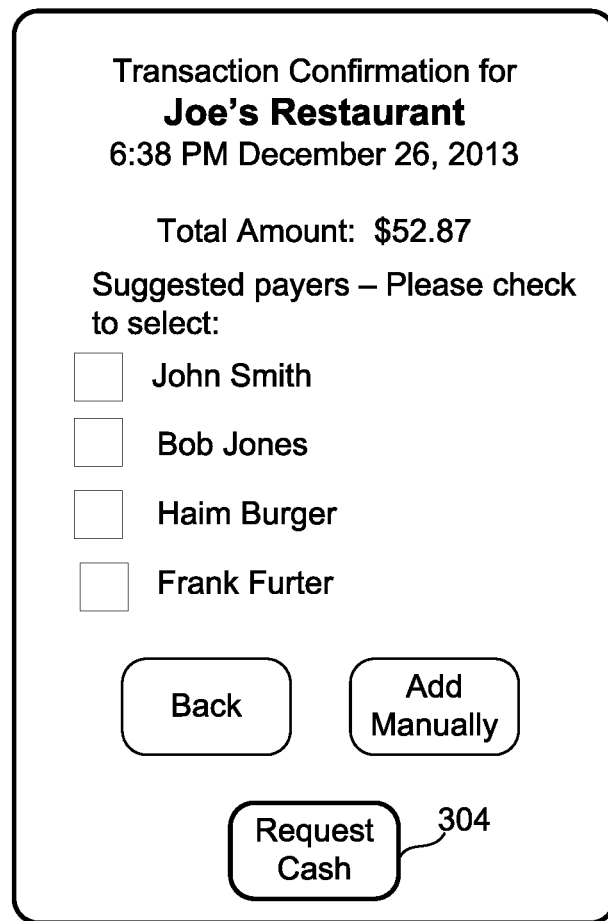
Figure 3E:
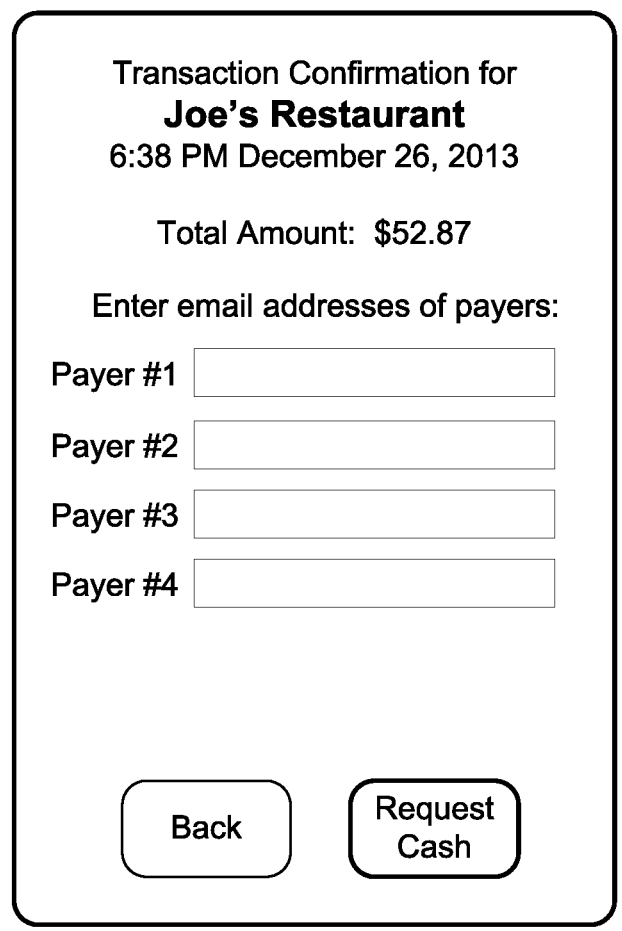

The mobile application 120 can generate a list of suggested payers based on, for example, the consumer's address book stored in the mobile device 120 and/or the consumer's recently used contacts stored on the mobile device 120. In addition, or as an alternative, the mobile application 120 may identify other nearby users of the mobile application as potential payers. For example, the mobile application 120 may invoke a short-range wireless communication feature of the mobile device 102, such as Bluetooth, Bluetooth Low Energy, infrared communication, WiFi, or the like, to identify other nearby mobile devices running instances of the mobile application. In some embodiments such other instances of the mobile application would be associated with other users who are registered with the PSS 108. Assuming the user chooses to receive a list of suggested payers, the user is given the choice to select or not select each suggested payer, as illustrated in FIG. 3D, and further is enabled to specify additional payers manually. The consumer can indicate that he is satisfied with the selections by touching the Request Cash button 304 or other similar control. FIG. 3E shows an example of the screen in which the user can specify payers manually. In various embodiments, the user can specify payees by name, email address, or other type of identifying information.

In some embodiments, after inputting the payers, the mobile application 120 prompts the consumer to input how the transaction amount should be apportioned among the specified payers. As illustrated in FIG. 3F, the options in this regard may include dividing the transaction amount equally among the payers, specifying a specific amount for each payer, specifying a percentage of the total amount for each payer, or (if the mobile device received an itemized receipt) assigning the cost of specific items to specific payers. FIG. 3G illustrates an example of a display screen that includes an itemized virtual receipt, in which the consumer can assign a payer to individual items involved in the transaction. In the itemized option, if the transaction amount included tax, the mobile application 120 can also compute the relevant amount of tax to assign to each payer, based on the cost of their items.

After the mobile application 120 has received all of the necessary user inputs from the consumer, specifying the apportionment of the transaction amount (step 213), a mobile application 120 causes the mobile device 102 at step 214 to send a message indicating that desired apportionment to the PSS 108, via the wireless network. The PSS 108 receives the message from the mobile device 102 indicating the desired apportionment at step 215. At step 216 the PSS 108 executes or triggers a process to carry out the apportionment according to the apportionment information received from the mobile device 102. The process of actually carrying out the apportionment specified by the consumer is called "reimbursement" herein.

Any of various methods can be used for reimbursement, and the details of such methods are not necessary for understanding the technique introduced above. Nonetheless, to facilitate better understanding of the technique introduced above, it is noted that reimbursement can include, for example, the PSS 108 simply sending an email or other type of electronic message to each specified payee, requesting that they reimburse the consumer for their portions of the transaction amount. In other embodiments, the consumer may carry his own personal card reader, such as a card reader that is removably attachable to his mobile device, and the consumer may then use that card reader with his mobile device to accept credit card reimbursement payments from the other payers. In such cases, the consumer may be preregistered with the PPS 108 as a "merchant" to be able to accept credit card payments in this manner.

In some embodiments, reimbursement may be accomplished by enabling one or more of the specified payee's to reimburse the consumer by using a standard person-to-person electronic messaging protocol to transfer funds. In one such embodiment, for example, a payee sends an email to a predetermined email address associated with a third-party payment system, which may be, or may be associated with, the PSS 108, for example. The email includes the amount to be paid and the email address of the intended recipient of the funds (where in this example, the intended recipient is the consumer who initially paid for the transaction). The payment system, upon receiving the email, looks up a financial account of the sender of the email (who has previously registered with the payment system) and, if available, a financial account of the specified recipient (who may or may not have previously registered with a payment system). The payment system then carries out or requests a transfer of the specified amount from the sender's account to the recipient account, if it knows the account number of the recipient; otherwise, the payment system sends an email to the email address of the specified recipient, informing the recipient of the attempted payment and inviting the recipient to provide a financial account number to the payment system in order to receive the payment.

Figure 4:
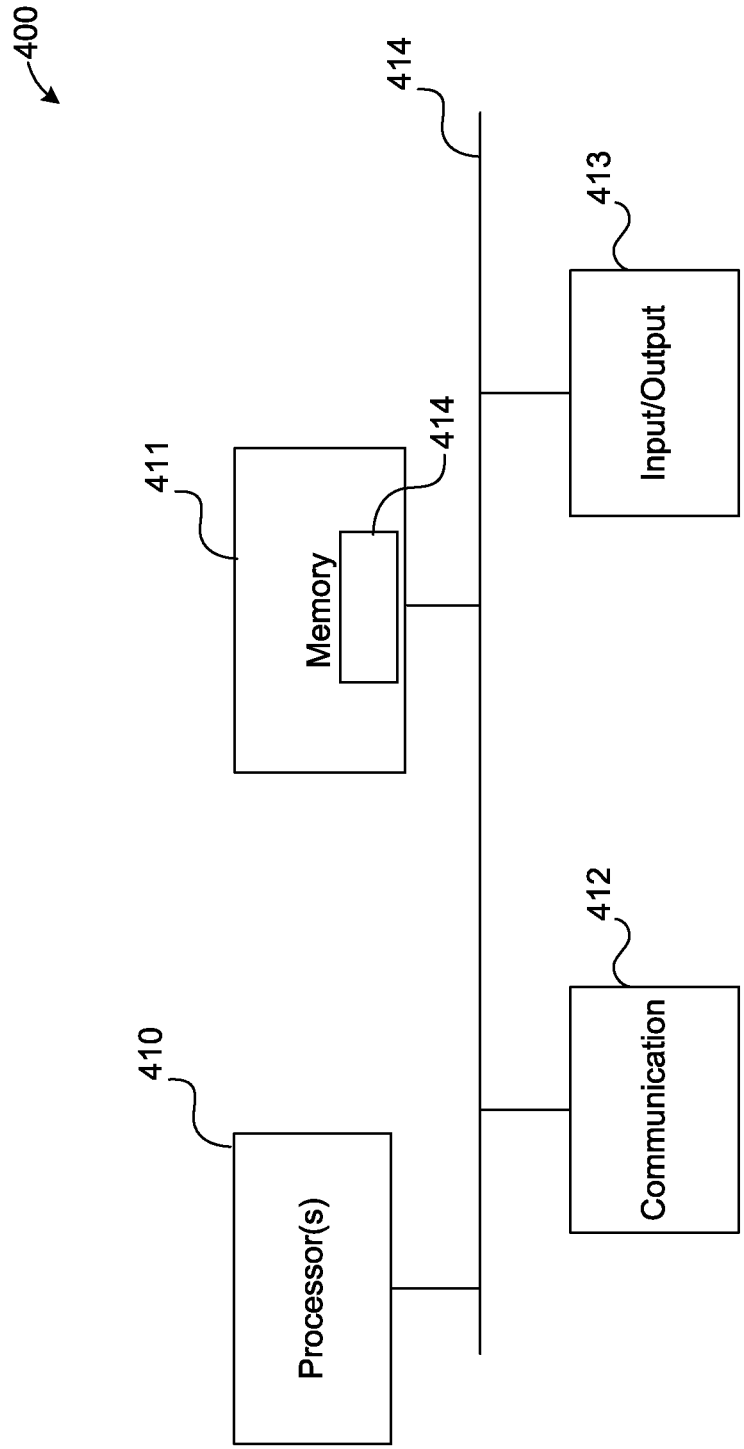
FIG. 4 is a high-level block diagram showing an example of processing system in which at least some operations related to the bill splitting technique can be implemented.

FIG. 4 is a high-level block diagram showing an example of a processing device 400 that can represent any of the devices described above, such as the mobile device 102, the merchant POS system 104, payment service system 108, acquirer system 114, card payment network 116, or issuer system 118. As noted above, any of these systems may include two or more processing devices such as represented in FIG. 9, which may be coupled to each other via a network or multiple networks.

In the illustrated embodiment, the processing system 400 includes one or more processors 410, memory 411, a communication device 412, and one or more input/output (I/O) devices 413, all coupled to each other through an interconnect 414. The interconnect 414 may be or include one or more conductive traces, buses, point-to-point connections, controllers, adapters and/or other conventional connection devices. The processor(s) 410 may be or include, for example, one or more general-purpose programmable microprocessors, microcontrollers, application specific integrated circuits (ASICs), programmable gate arrays, or the like, or a combination of such devices. The processor(s) 410 control the overall operation of the processing device 400. Memory 411 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 411 may store data and/or instructions 415 that configure the processor(s) 410 to execute operations in accordance with the techniques described above. The communication device 412 may be or include, for example, an Ethernet adapter, cable modem, Wi-Fi adapter, cellular transceiver, Bluetooth transceiver, or the like, or a combination thereof. Depending on the specific nature and purpose of the processing device 400, the I/O devices 413 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
receiving, by a payment service system (PSS) over a network, and from a point-of-sale (POS) system, a request for approval of a payment transaction in which a consumer has used a payment object associated with a financial account of the consumer, the request for approval including a transaction amount for the payment transaction;
in response to the request for approval, identifying, by the PSS, the financial account of the consumer and causing funds from the financial account of the consumer to be applied to the payment transaction;
causing, by the PSS, a mobile payment application associated with the PSS and executing on a mobile processing device of the consumer to:
display one or more first user interfaces for receiving first input from the consumer, the first input comprising a request for the mobile payment application to identify one or more suggested payers to include in a group with the consumer for splitting the transaction amount;
identify the one or more suggested payers by invoking a short-range wireless communication feature on the mobile processing device, wherein the short-range wireless communication feature identifies one or more nearby processing devices that are executing instances of the mobile payment application, and wherein the one or more suggested payers are associated with the one or more nearby processing devices; and
display one or more second user interfaces for receiving second input from the consumer, the second input comprising a selection of at least one suggested payer of the one or more suggested payers, wherein the selection corresponds to a selected payer;
determining, by the PSS and based on the selected payer, that the consumer has requested at least a portion of the transaction amount for the payment transaction to be apportioned among the group comprising the selected payer and the consumer;
sending, from the PSS and to an instance of the mobile payment application executing on a mobile processing device of the selected payer, a message requesting that the selected payer reimburse the consumer for a respective portion of the transaction amount;
receiving, by the PSS and from the instance of the mobile payment application executing on the mobile processing device of the selected payer, a confirmation that the selected payer agrees to reimburse the consumer for the respective portion of the transaction amount; and
in response to receiving the confirmation, facilitating, by the PSS, a transfer of the respective portion of the transaction amount from a financial account of the selected payer to the financial account of the consumer.

2. The method as recited in claim 1, further comprising causing, by the PSS, the mobile payment application executing on the mobile processing device of the consumer to further identify the one or more suggested payers from a stored contact list of the consumer.

3. The method as recited in claim 1, further comprising causing, by the PSS, the mobile payment application executing on the mobile processing device of the consumer to further identify the one or more suggested payers by identifying a particular payment mechanism associated with the one or more nearby processing devices.

4. The method as recited in claim 1, further comprising causing, by the PSS, the mobile payment application executing on the mobile processing device of the consumer to prompt the consumer to provide an electronic messaging address of at least one of the one or more suggested payers to whom a portion of the transaction amount is to be apportioned.

5. The method as recited in claim 1, wherein the one or more first and second user interfaces enable the consumer to apportion the transaction amount by at least one of: amount, percentage of the transaction amount, or items included in the payment transaction.

6. The method as recited in claim 1, wherein the one or more first and second user interfaces display an itemization indicating items included in the payment transaction, and wherein the one or more first and second user interfaces enable the consumer to apportion a cost of any of the items to a specified payer from the one or more suggested payers.

7. The method as recited in claim 1, wherein the payment object is a payment card, wherein the request for approval is routed to the PSS through one or more routing entities, and wherein a card number on the payment card is sufficient to enable the one or more routing entities to determine that the request for approval is to be routed to the PSS.

8. The method as recited in claim 1, wherein the payment object is a payment card, and wherein the method further comprises determining information usable to communicate with the mobile processing device of the consumer, based on stored data representing an association previously created by the consumer between the payment card and the mobile processing device of the consumer.

9. The method as recited in claim 1, wherein the payment object is a proxy card, and wherein the proxy card is associated with at least one of multiple financial accounts or a plurality of different payment mechanisms of the consumer.

10. A processing system comprising:
a communication device through which the processing system can communicate with remote devices over a network;
a memory; and
a processor, coupled to the communication device and the memory, to control the processing system, the processor configured to cause the processing system to perform operations that include:
receiving, over the network and from a point-of-sale (POS) system, a request for approval of a payment transaction in which a consumer has used a payment object associated with a financial account of the consumer, the request for approval including a transaction amount for the payment transaction;
in response to the request for approval, identifying the financial account of the consumer and causing funds from the financial account of the consumer to be applied to the payment transaction;

causing a mobile payment application associated with the PSS and executing on a mobile processing device of the consumer to:
   display one or more first user interfaces for receiving first input from the consumer, the first input comprising a request for the mobile payment application to identify one or more suggested payers to include in a group with the consumer for splitting the transaction amount;
   identify the one or more suggested payers by invoking a short-range wireless communication feature on the mobile processing device, wherein the short-range wireless communication feature identifies one or more nearby processing devices that are executing instances of the mobile payment application, and wherein the one or more suggested payers are associated with the one or more nearby processing devices; and
   display one or more second user interfaces for receiving second input from the consumer, the second input comprising a selection of at least one suggested payer of the one or more suggested payers, wherein the selection corresponds to a selected payer;
determining, based on the selected payer, that the consumer has requested at least a portion of the transaction amount for the payment transaction to be apportioned among the group comprising the selected payer and the consumer;
sending, to an instance of the mobile payment application executing on a mobile processing device of the selected payer, a message requesting that the selected payer reimburse the consumer for a respective portion of the transaction amount;
receiving, from the instance of the mobile payment application executing on the mobile processing device of the selected payer, a confirmation that the selected payer agrees to reimburse the consumer for the respective portion of the transaction amount; and
in response to receiving the confirmation, facilitating a transfer of the respective portion of the transaction amount from a financial account of the selected payer to the financial account of the consumer.

11. The processing system as recited in claim 10, wherein the operations further include causing the mobile payment application executing on the mobile processing device of the consumer to further identify the one or more suggested payers from a stored contact list of the consumer.

12. The processing system as recited in claim 10, wherein the operations further include causing the mobile payment application executing on the mobile processing device of the consumer to further identify the one or more suggested payers by identifying a particular payment mechanism associated with the one or more nearby processing devices.

13. The processing system as recited in claim 10, wherein the operations further include causing the mobile payment application executing on the mobile processing device of the consumer to prompt the consumer to provide an electronic messaging address of at least one of the one or more suggested payers to whom a portion of the transaction amount is to be apportioned.

14. The processing system as recited in claim 10, wherein the one or more first and second user interfaces enable the consumer to apportion the transaction amount by at least one of: amount, percentage of the transaction amount, or items included in the payment transaction.

15. The processing system as recited in claim 10, wherein the one or more first and second user interfaces display an itemization indicating items included in the payment transaction, and wherein the one or more first and second user interfaces enable the consumer to apportion a cost of any of the items to a specified payer from the one or more suggested payers.

16. The processing system as recited in claim 10, wherein the payment object is a payment card, wherein the request for approval is routed to the PSS through one or more routing entities of the remote devices, and wherein a card number on the payment card is sufficient to enable the one or more routing entities to determine that the request for approval is to be routed to the PSS.

17. The processing system as recited in claim 10, wherein the payment object is a payment card, and wherein the operations further include determining information usable to communicate with the mobile processing device of the consumer, based on stored data representing an association previously created by the consumer between the payment card and the mobile processing device of the consumer.

18. The processing system as recited in claim 10, wherein the payment object is a proxy card, and wherein the proxy card is associated with at least one of multiple financial accounts or a plurality of different payment mechanisms of the consumer.

19. The method as recited in claim 1, further comprising:
   receiving, by the PSS and from the mobile payment application executing on the mobile processing device of the consumer, an apportionment of items included in the payment transaction to the selected payer; and
   based on the apportionment, automatically determining respective amounts of tax to assign to the consumer and the selected payer.

20. The method as recited in claim 1, further comprising, in response to receiving the confirmation, accessing a database associated with the PSS to identify the financial account of the selected payer based at least in part on information associated with the confirmation, wherein the transfer of the respective portion of the transaction amount is executed by the PSS via a withdrawal of the portion of the transaction amount from the financial account of the selected payer and a deposit of the portion of the transaction amount to the financial account of the consumer.

* * * * *